Nov. 30, 1937.     N. A. PALMGREN     2,100,668
RADIAL PLAIN BEARING
Filed Dec. 7, 1934
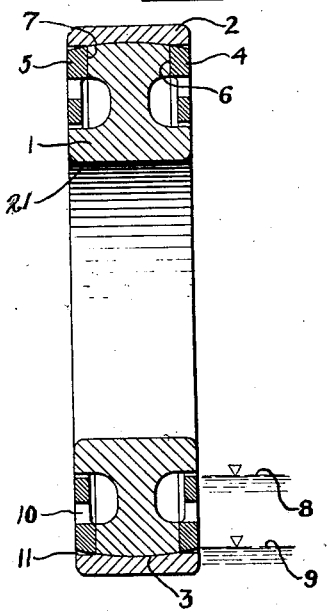
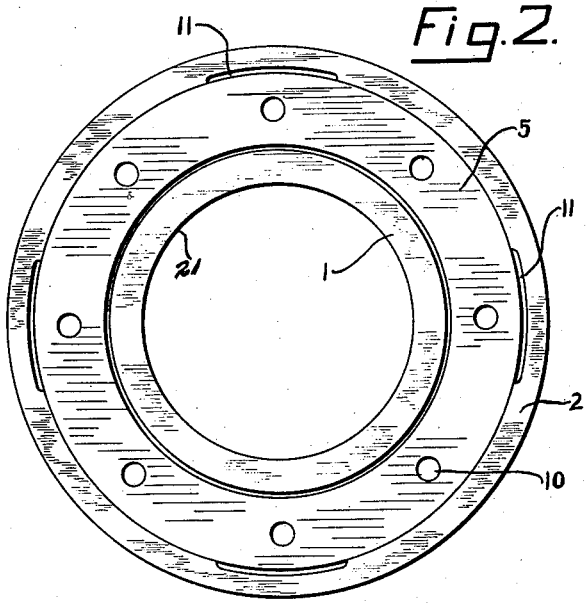
INVENTOR
Nils Arvid Palmgren
BY
his ATTORNEY Patented Nov. 30, 1937

2,100,668

UNITED STATES PATENT OFFICE 2,100,668

RADIAL PLAIN BEARING

Nils Arvid Palmgren, Goteborg, Sweden, assignor to Aktiebolaget Svenska Kullagerfabriken, Goteborg, Sweden, a corporation of Sweden Application December 7, 1934, Serial No. 756,540
In Sweden January 29, 1934

5 Claims. (Cl. 308—170)

The object of the present invention is to provide a plain bearing having overall dimensions corresponding to those standardized for ball bearings and which can be run directly in an oil bath without causing formation of foam in the lubricant. A further purpose of the invention is to provide simple means for taking up thrust loads.

According to the invention the bearing comprises an inner bearing ring with sliding surface on the outer periphery, an outer bearing ring and annular side discs disposed therein, the inner diameter of the said discs being substantially less than the diameter of the sliding surface of the inner bearing ring.

One practicable embodiment of my invention is illustrated in the accompanying drawing.

Figure 1 is a section in an axial plane through a bearing according to one embodiment of my invention, and Figure 2 is a side view thereof.

The inner ring 1 is shown provided with the customary bore 21, adapting it to be mounted on a shaft, and is provided on its outer periphery with a sliding surface 3 having the form of a spherical zone. The sectional height of the ring is such that the sliding surface has a comparatively great radius. The outer ring 2 is intended to be mounted in some suitable housing formed at its lower part with a reservoir capable of holding an oil bath and is shown having a spherical inner face fitting onto the sliding outer surface of the inner ring, and is sufficiently wide to support the peripheries two side discs 4 and 5. The said discs have a substantially smaller inner diameter than the sliding surface of the inner ring, and the level of the oil bath may, therefore, be allowed to rise to the level 8, without the oil bath being churned by the inner ring. Without the side discs, the level should not be allowed to rise higher than to 9, in order to avoid formation of foam. The side discs are perforated at 10, to allow the interior of the bearing to be drained, but owing to the small size of the holes, the rotation of the inner ring and of the oil rotating therewith cannot transmit its movement to the oil bath outside the side discs.

The side discs 4 and 5 are provided with bearing surfaces 6 and 7 respectively, facing the inner ring and lying in a radial plane. The bearing is thus rendered capable of also taking up thrust loads. As shown in the figure, the side discs 4 and 5 bear against the parts of the outer ring 2 which constitute direct continuations of the spherical sliding surfaces of the last mentioned ring at both sides. This permits the side discs to tilt with the inner ring if the latter should assume a skew position relative to the outer ring. Variations in pressure distribution around the bearing surfaces 6, 7 of the side discs are thereby kept within small limits, and the thrust capacity in skew positions is maintained.

A number of grooves 11 are provided at the edges of the outer ring so that the side discs will be supported by the outer ring only at a number of separated contact areas. By this means the essential advantage is obtained that the originally plane bearing surfaces 6, 7 of the discs, when loaded, will be subjected to local deflections which assist in the formation of wedge shaped oil spaces which are necessary for obtaining complete fluid friction. Through the side discs the centres of the spherical sliding surfaces of the inner and outer rings are prevented from being displaced axially relative to one another which would have a disadvantageous influence on the radial carrying capacity of the bearing. Since, however, the side discs are located within the figure circumscribing the section through the inner and outer bearing rings, the entire bearing can be contained within ball bearing standard outer dimensions.

Having thus described my invention, I claim and desire to secure by Letters Patent:

1. In a plain bearing, adapted to be mounted in a housing formed at its lower part with a reservoir capable of holding an oil bath, the combination with an inner bearing member adapted to be fixed to a rotary shaft and provided with annular thrust taking bearing surfaces lying in a radial plane, of a stationary outer bearing ring member, and a stationary ring member bearing against the thrust taking surfaces of the said inner bearing member and being adapted to be interposed between the oil bath and the rotary bearing part, the inner diameter of the said stationary ring member being substantially smaller than the inner diameter of the annular thrust taking surfaces of said inner bearing member, the said stationary ring member having an aperture for putting the oil bath into communication with the interior of the bearing.

2. A radial plain bearing according to claim 1, characterized thereby that the side discs are located within the figure circumscribing the section through the inner and outer bearing rings.

3. A plain bearing according to claim 1 in which the stationary ring member has a plurality of apertures located at a distance from the axis of the bearing less than the inner radius of the thrust taking surface of the inner bearing member.

4. In a plain bearing adapted to be mounted in a housing formed at its lower part with a reservoir capable of holding an oil bath, the combination with an inner bearing member adapted to be fixed to a rotary shaft and being wider at its inner and outer portions than at its intermediate portion, thereby forming an inner seating portion and an outer bearing portion, of a stationary outer bearing ring member and a stationary ring member at each side of said outer bearing member and being adapted to be interposed between the oil bath and the rotary bearing member, the said stationary ring members extending inwardly beyond the inner diameter of the side face of the bearing portion and having apertures for putting the oil bath into communication with the interior of the bearing.

5. A plain bearing according to claim 4, in which certain of the apertures in the stationary ring members are at the same distance from the axis of the bearing as the sliding surface of the bearing.

NILS ARVID PALMGREN.